United States Patent [19]

Wang

[11] Patent Number: 5,778,153

[45] Date of Patent: Jul. 7, 1998

[54] NEURAL NETWORK UTILIZING LOGARITHMIC FUNCTION AND METHOD OF USING SAME

[75] Inventor: Shay-Ping Thomas Wang, Long Grove, Ill.

[73] Assignee: Motorola, Inc., Schaumburg, Ill.

[21] Appl. No.: 780,532

[22] Filed: Jan. 8, 1997

Related U.S. Application Data

[63] Continuation of Ser. No. 176,601, Jan. 3, 1994, abandoned.

[51] Int. Cl.$^6$ ............................................. G06F 15/18
[52] U.S. Cl. ........................... 395/24; 395/20; 395/21; 395/23
[58] Field of Search ............................ 395/20, 21, 23, 395/24

[56] References Cited

U.S. PATENT DOCUMENTS

| | | | |
|---|---|---|---|
| 3,551,663 | 12/1970 | Herron et al. | 235/159 |
| 3,748,451 | 7/1973 | Ingwersen | 235/156 |
| 3,922,536 | 11/1975 | Hampel et al. | 235/152 |
| 3,941,990 | 3/1976 | Rabasse | 235/176 |
| 3,967,100 | 6/1976 | Shimomura | 235/152 |
| 4,156,922 | 5/1979 | Majerski et al. | 364/757 |
| 4,626,825 | 12/1986 | Burleson et al. | 340/347 |
| 4,849,925 | 7/1989 | Peckerar et al. | 395/24 |
| 4,905,143 | 2/1990 | Takahashi et al. | 364/200 |
| 4,949,292 | 8/1990 | Hoshino et al. | 364/736 |
| 5,042,001 | 8/1991 | Brightman et al. | 364/736 |
| 5,068,816 | 11/1991 | Noetzel | 364/718 |
| 5,072,130 | 12/1991 | Dobson | 395/24 |
| 5,073,867 | 12/1991 | Murphy et al. | 395/27 |
| 5,109,524 | 4/1992 | Wagner et al. | 395/800.42 |
| 5,113,367 | 5/1992 | Marrian et al. | 395/21 |
| 5,220,559 | 6/1993 | Tsuzuki et al. | 370/60 |
| 5,278,945 | 1/1994 | Basehore et al. | 395/27 |
| 5,331,582 | 7/1994 | Sudo et al. | 364/722 |
| 5,337,266 | 8/1994 | Arnold | 364/748.5 |
| 5,343,254 | 8/1994 | Wada et al. | 348/627 |
| 5,359,551 | 10/1994 | Pickett | 364/718 |
| 5,365,465 | 11/1994 | Larson | 364/715.03 |
| 5,381,513 | 1/1995 | Tsuboka | 395/2.41 |
| 5,444,819 | 8/1995 | Negishi | 395/22 |
| 5,450,522 | 9/1995 | Hermansky et al. | 395/2.1 |
| 5,517,667 | 5/1996 | Wang | 395/24 |
| 5,553,012 | 9/1996 | Buss et al. | 364/722 |

OTHER PUBLICATIONS

Algorithm Design for a 30 bit Integrated Logarithmic Processor by David M. Lewis and Lawrence K. Yu, Department of Electrical Engineering, University of Toronto, Proceeding 9th Symposium on Computer Arithmetic, 1989, IEEE Comp. Soc. Press, pp. 192–199.

An Architecture for Addition and Subtraction of Long Word Length Numbers in the Logarithmic Number System by David M. Lewis, Member, IEEE, IEEE Transactions on Computers, vol. 39, No. 11, Nov. 1990, pp. 1325–1336.

A 30–b Integrated Logarithmic Number System Processor by Lawrence K. Yu, Member, IEEE, and David M. Lewis, Member, IEEE, IEEE Journal of Solid–State Circuits, vol. 26, No. 10, Oct. 1991, pp. 1433–1440.

An Accurate LNS Arithmetic Unit Using Interleaved Memory Function Interpolator by David M. Lewis, Department of Electrical Engineering, University of Toronto, Proceeding 11th Symposium on Computer Arithmetic, 1993, IEEE Comp. Soc. Press, pp. 2–9.

Interleaved Memory Function Interpolators with Application to an Acuurate LNS Arithmetic Unit by David M. Lewis, Member, IEEE, IEEE Transactions on Computers, vol. 43, No. 8, Aug. 1994, pp. 974–982.

(List continued on next page.)

Primary Examiner—George B. Davis
Attorney, Agent, or Firm—James E. Gauger

[57] ABSTRACT

A neural network, which may be implemented either in hardware or software, is constructed of neurons or neuron circuits each having only one significant processing element in the form of an adder. Each neural network further includes circuits for applying a logarithmic function to its inputs and for applying an inverse-logarithmic function to the outputs of its neurons. The neural network utilizes a training algorithm which does not require repetitive training and which yields a global minimum to each given set of input vectors.

53 Claims, 6 Drawing Sheets

OTHER PUBLICATIONS

Table–Lookup Algorithms for Elementary Functions and Their Error Analysis by Ping Tak Peter Tang, Matematics and Computer Schience Division, Argonne National Laboratory, 9700 S. Cass Ave., Argonne, IL 60439–4801, Proceeding 10th Symposium on Computer Arithmetic, Jun. 1991, pp. 232–236.

Applying Features of IEEE 754 to Sign/Logarithm Arithmetic by Mark G. Arnold, Member, IEEE, Thomas A. Bailey, Member, IEEE, John R. Cowles, and Mark D. Winkel, IEEE Transactions on Computers, vol. 41, No. 8, Aug. 1992, pp. 1040–1050.

D8.13 Improved Accuracy for Logarithmic Addition in DSP Applications by Mark G. Arnold, John Cowles, and Thomas Bailey, Computer Science Department, University of Wyoming, Laramie, WY, ICASSP 88: Int. Conf. on Acoustics, Speech and Signal Processing, vol. 3 pp. 1714–1717.

Comments on "An Architecture for Addition and Subtraction of Long Word Length Numbers in the Logarithmic Number System"[1] by M. Arnold, T. Bailey and J. Cowles, IEEE Transactions on Computers, vol. 41, No. 6, Jun. 1992, pp. 786–788.

Redundant Logarithmic Arithmetic, Mark G. Arnold, Member IEEE, Thomas A. Bailey, Member IEEE, John R. Cowles, and Jerry J. Cupal, Members IEEE, IEEE Transactions on Computers, vol. 39, No. 8, Aug. 1990, pp. 1077–1086.

The Efficient Implimentation and Analysis of a Hybrid Number System Processor, Fang–shi Lai, IEEE Transactions on Circuits and Systems, II: Analog and Digital Signal Processing, vol. 40, No. 6, Jun. 1993, pp. 382–392.

Polynomial and Standard Higher Order Neural Network, Chir–Ho Chang, Jin–Ling Lin, and J.Y. Cheung, Electrical Engineering and Computer Science, University of Oklahoma, 1993 IEEE International Conference on Neural Networks, Mar. 28–Apr. 1, 1993, pp. 989–994.

A Digital Neuron–Type Processor and Its VLSI Design, Mahmoud K. Habib, Member, IEEE, and H. Akel, 8090 IEEE Transactions on Circuits and Systems 36(1989) May. No. 5, New York, US. pp. 739–746.

A Neural Feed–Forward Network with a Polynomial Nonlinearity, Nils Hoffmann, Electronics Institute, Building 349, Technical University of Denmark, DK–2800 Lyngby, Denmark, Neural Networks for Signal Processing, Proceedings of the IEEE–SP Workshop, Aug. 31–Sep. 2, 199?, pp. 49–58.

A Polynomial time Algorithm for Generating Neural Networkes for Classification Problems, Asim Roy and Somnath Mukhopadhyay, Dept. of Decision and Information Systems, Arizona State University, IJCNN, 1992, 0–7803–0559–0/92 IEEE, pp. I–147–I–152.

Polynomial Functions Can Be Realized by Finite Size Multilayer Feedforward Neural Networks, Naohiro TODA, Ken–ichi Funahashi and Shiro Usui, Department of Information and Computer Sciences, Toyohashi University of Technology, Tempaku, Toyohashi 441, Japan, 1991 IEEE International Joint Conference on Neural Networks, vol. 1of3,The Wetsin Stamford and Westin Plaza, 18–21, Nov. 1991, Singapore.

An Artificial Neural Networks for Approximating Polynomial Functions, Behnam Malakooti and YingQing Zhou, Department of Ssytems Engineering, Center for Automation and Intelligent Systmes Research, Case Western Reserve University, Cleveland, Ohio,International Joint Conference on Neural Networks, Jun. 1992, pp. III–966–III–971.

Robot Kinematics Learning Computations Using Polynomial Neural Networks, C.L. Philip Chen and A.D. McAulay, Department of Computer Science and Engineering, Wright State University, Dayton, OH 45435, Proceedings of the 1991 IEEE, International Cof. on Robotics and Automation, Sacramento, CA, Apr. 1991, pp. 2638–2643.

Backpropagation Based on the Logarithmic Error Function and Elimination of Local Minima, Kiyotoshi Matsuoka and Jianqiang Yi, Department of Control Engineering, Kyushu Institute of Technology, Sensul 1–1, Tobata, Kitakyushu, 804 Japan, CH3065–0/91/0000–1117 IEEE, pp. 1117–1122.

Output Weight Optimization for the Multi–Layer Perceptron by M.T. Manry, Xiujun Guan, S.J. Apollo, L.S. Allen, W.D. Lyle, and W. Gong, Department of Electrical Engineering, University of Texas at Arlington, Arlington, Texas, Conference Record of the Twenty Sixth Asilomar conf. on Signals, Systems and Computers, Oct. 26–28, 1992, pp. 502–506.

Generalization and Learning in Volterra and Radial Basis Function Networks: A Theoretical Analysis, Sean B. Holden and Peter J. W. Rayner, Cambridge University Engineering Department, Trumpington Street, Cambridge CB2 1PZ, U.K.A. 0–7803–0532–9/92, 1992 IEEE, pp. II–273–II276.

On the Design Principlpes of the Functional Link Nets, Jun Wang and Edilberto P. Teixeira, Department of Systems Engineering, Case Western Reserve University, Cleveland, Ohio 44106, pp. 613–616, Ieee International Conf. on Systems Engineering, Aug. 9–11, 1990, Vista International Hotel, Pittsburgh, Pennsylvania, IEEE Catalog No:90CH2872–0.

A Neural Network Systems Component, Dean Mueller and Dan Hammerstrom, Adaptive Solutions, Inc, 1400 NW Compton Drive Suite 340, Beaverton, Oregon 97006,pp. 1258–1264, Neural Networks, 1993 International Conference.

Parallel Coprocessor for Kohonen's Self–Organizing Neural Network, Jukka Saarinen, Martti Lindroos, Jouni Tomberg and Kimmo Kaski, Tampere University of Technology, Microelectronics Laboratory, P.O. Box 527, SF–33101 Tampere, Finland, pp. 537–542 Parallel Processing, 1992 Symposium.

Hoffmann et al., "A Neural Feed–Forward Network with a Polynomial Nonlineeearity", Neural Networks for Signal processing II, Proceedings of the IEEE SP Workshops, 31 Aug.–2 Sept. 1992.

A 10–ns Hybrid Number System Data Execution Unit for Digital Signal Processing Systems by Fang–shi Lai, IEEE Journal of Solid–State Circuits, vol. 26, No. 4, Apr. 1991, pp. 590–599.

A Hybrid Number System Processor with Geometric and Complex Arithmetic Capabilities by Fang–shi Lai, and Ching–Farn Eric We, IEEE Transactions on Computers, vol. 40, No. 8, Aug. 1991, pp. 952–960.

A 3.84 GIPS Integrated Memory Array Processor with 64 Processing Elements and a 2–Mb SRAM by Nobuyuki Yamashita, Tohru Kimura, Yoshihiro Fujita, Yoshiharu Aimoto, Takashi Manabe, Shin'ichiro Okazaki, Kazuyuki Nakamura, and Masakazu Yamashina, IEEE Journal of Solid–State Circuits, vol. 29, No. 11, Nov. 1994, pp. 1336–1343.

"The Efficient Implementation and Analysis of a Hybrid Number System Processor" by Fang-shi Lai, IEEE Transactions on Circuits and Systems–II: Analog and Digital Signal Processing, vol. 40, No. 6, Jun. 1993.

Sandon et al, "Logarithmic Search in a winner-take all network", IEEE Inter-conf-on Neural Networks, 1991.

Caudell et al, "Neural Network Architecture for Linear Programming", IEEE Inter-conf-on Neural Networks, 1992.

Philip et al, "Robot Kinematics Learning Computations Using Polynomial Neural Networks", IEEE Inter-conf-on Robotics and Automation, 1991.

Etienne–Cummings, "Real Time 2–D motion Detector VISI Circuit", IEEE Inter-conf-on Neural Networks, 1992.

Bogatoc V. A., "Neural Alogorithms of Data Perfoming in finite Field GF $(2^m)$", IEEE Symposium on Neuroinformatics and Neurocomputers, 1992.

Matsuoka et al, "Backpropagation Based on the Logarithmic error function and Estimation of local minima", IEEE Inter-conf-on Neural Networks, 1991.

Hoffmann et al, "A Neural Feed-forward Network with a polynomial Nonlinearity", Neural Networks for Signal processing II, proceedings of the IEEE SP Workshops, 31 Aug.–2 Sep.–1992.

NEURAL NETWORK UTILIZING LOGARITHMIC FUNCTION AND METHOD OF USING SAME

This is a continuation of application Ser. No. 08/176,601, filed Jan. 3, 1994 and now abandoned.

RELATED INVENTION

The present invention is related to the following inventions which are assigned to the same assignee as the present invention:

(1) "Neuron Circuit and Method of Using Same", having Ser. No. 08/076,602, (2) "Artificial Neuron Using Adder Circuit and Method of Using Same", having Ser. No. 08/176,604 filed concurrently herewith.

(3) "Neural Network and Method of Using Same", having Ser. No. 08/076,601

The subject matter of the above-identified related inventions is hereby incorporated by reference into the disclosure of this invention.

TECHNICAL FIELD

This invention relates generally to artificial neural networks and, in particular, to a neural network that can be implemented in a VLSI (very large scale integration) chip or in a computer program and which utilizes a training algorithm that does not require repetitive training and that yields a global minimum to each given set of input vectors.

BACKGROUND OF THE INVENTION

Artificial neural networks have utility in a wide variety of computing environments, such as speech recognition, process control, optical character recognition, signal processing, and image processing. Processing engines for many of the foregoing may be implemented through neural networks comprising a plurality of elemental logic elements called neuron circuits.

A neuron circuit (or processing element) is the fundamental building block of a neural network. A neuron circuit has multiple inputs and one output.

As described in Related Invention No. 1 identified above, the structure of a conventional neuron circuit often includes a multiplier circuit, a summing circuit, a circuit for performing a non-linear function (such as a binary threshold or sigmoid function), and circuitry functioning as synapses or weighted input connections. Because a typical conventional neuron circuit requires all of the above-described circuitry, the number of neuron circuits which can be manufactured on a semiconductor chip is severely limited. Related Invention No. 1 discloses, in one embodiment, a neuron circuit which comprises only a multiplier as its main processing element, while the above-identified Related Invention No. 2 discloses, in one embodiment, a neuron circuit which comprises only an adder as its main processing element.

As discussed in Related Invention No. 3 identified above, there are more than twenty known types of neural network architectures, of which the "back-propagation", "perceptron", and "Hopfield network" are the best known. Related Invention No. 3 discloses, in one embodiment, a neural network which does not require repetitive training, which yields a global minimum to each given set of input vectors, and which has an architecture that is easy to implement. Although the neural network disclosed in Related Invention No. 3 represents a very significant advance over the previously known prior art, it would be desirable to provide an improved neural network which has at least the advantages of that disclosed in Related Invention No. 3 and which is even simpler and less expensive and requires even less silicon space when implemented on an integrated circuit.

Thus there is a significant need for a neural network which does not require repetitive training, which yields a global minimum to each given set of input vectors, and which has a straight-forward architecture that is easy and inexpensive to implement.

SUMMARY OF INVENTION

A preferred embodiment of a neural network designed in accordance with the teachings of the present invention comprises a logarithmic function for taking the logarithm of external inputs to the network; a plurality of neuron circuits, such as those described in the above-identified Related Invention No. 2 or their software equivalents; an inverse-logarithmic function for performing an inverse-logarithm on the outputs of the neurons; and a means for summing the output of the inverse-logarithm function.

In contrast to conventional neural networks which require lengthy training cycles, a neural network constructed in accordance with the present invention converges on a global solution in a single training cycle (also referred to as an epoch or iteration) which can often be computed in no more than a few minutes on a personal computer.

Moreover, in contrast to conventional neural networks, there is provided in accordance with the present invention a neural network which utilizes a plurality of neuron circuits which do not individually utilize any non-linear function and which each require only an adder circuit as its main processing element. Therefore, many more neuron circuits can be integrated in a VLSI chip, which greatly increases the computational power of a neural network using one or more of such chips.

Thus it will be appreciated that a neural network constructed in accordance with the present invention performs with vastly more accurate results, at a vastly improved reduction in computational time, and with a vast reduction in the cost and complexity of its implementation, whether on a semiconductor chip or in a computer program.

In addition, a neural network constructed in accordance with the present invention can have multiple outputs by providing multiple summing circuits for summing the outputs of the neuron circuits.

Thus it is an advantage of the present invention to provide a neural network which utilizes a plurality of neuron circuits which each require essentially only an adder circuit as its main processing element, so that a neural network may be built comprising a very large number of such neuron circuits, resulting in a product which is commercially competitive due to its high level of functionality and low cost of manufacture.

It is also an advantage of the present invention to provide a neural network which does not require repetitive training.

Yet another advantage of the present invention is to provide a neural network which yields a global minimum to each given set of input vectors.

It is another advantage of the present invention to provide a method of training a neural net work which does not require repetitive training.

It is also an advantage of the present invention to provide a method of using a neural network in accordance with the present invention.

According to one aspect of the invention, there is provided a neural network having a plurality of network inputs and at least one network output, the neural network comprising means for applying a logarithmic function to the network inputs to produce corresponding logarithmic inputs; a plurality of neurons, each neuron having a plurality of inputs responsive to corresponding ones of the plurality of logarithmic inputs and generating an output; means for applying an inverse-logarithmic function to each of the neuron outputs to produce corresponding inverse-logarithmic outputs; and means for summing the inverse-logarithmic outputs of the neurons and generating the at least one network output.

According to yet another aspect of the invention there is provided a neural network comprising a plurality of network inputs and at least one network output; a plurality of neurons, each neuron receiving a plurality of inputs and generating an output; means for producing logarithmic and inverse-logarithmic functions; and a method of operating said neural network, said method comprising the following steps: (a) said logarithmic function-producing means applying a logarithmic function to said network inputs to produce corresponding logarithmic inputs; (b) distributing each of said logarithmic inputs to each of said neuron inputs; (c) each neuron applying a gating function to each of said logarithmic inputs to produce corresponding gated inputs; (d) each neuron adding each of said gated inputs together to generate a sum; (e) each neuron adding said sum to a weight value to generate a neuron output for each neuron; (f) said inverse-logarithmic function-producing means applying an inverse-logarithmic function to each of said neuron outputs to produce corresponding inverse-logarithmic outputs; and (g) summing said inverse-logarithmic outputs of said neurons to generate said at least one network output.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

It will be understood by one of ordinary skill in the art that the neural network of the present invention may be implemented in hardware, software, or a combination thereof, and that such terms as "neuron circuit" and "neuron" are used interchangeably in this description, as are the terms "summing circuit", "summer", "adder circuit, adder", etc., depending upon the type of implementation.

Figure 1:
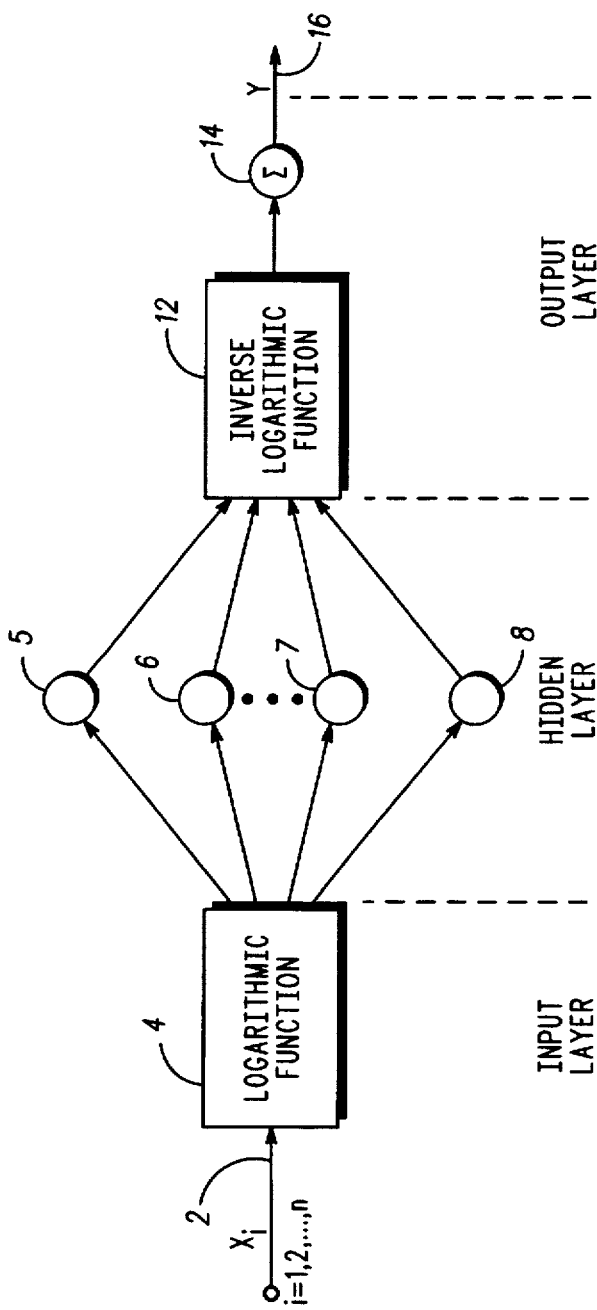
FIG. 1 shows a conceptual diagram of a neural network in accordance with the present invention.

FIG. 1 shows a conceptual diagram of a neural network in accordance with the present invention. A plurality of network inputs $x_1, x_2, \ldots, x_n$ are sequentially fed to a logarithmic function 4, which may be implemented as a circuit or as an algorithm, as appropriate, and which performs a logarithmic function upon its inputs, thereby producing logarithmic inputs.

As each input is applied to logarithmic function 4, the corresponding logarithmic output is distributed to each neuron (of which only neurons 5, 6, 7, and 8 are shown).

As described in the above-identified Related Invention, each neuron applies a gating function to the logarithmic input to produce a corresponding gated input. As the logarithm of each input $x_i$ is distributed to neurons 5–8, each neuron 5–8 may apply a gating function to it to form a gated input. Then each neuron 5–8 adds its gated input to the accumulated sum, if any, resulting from previous cycle(s), or otherwise to zero, to produce a new accumulated sum.

When the logarithm of the last input, $x_n$, is distributed to neurons 5–8, each neuron 5–8 adds its respective new accumulated sum to a weight value, if any, to form an accumulated sum.

Figure 7:
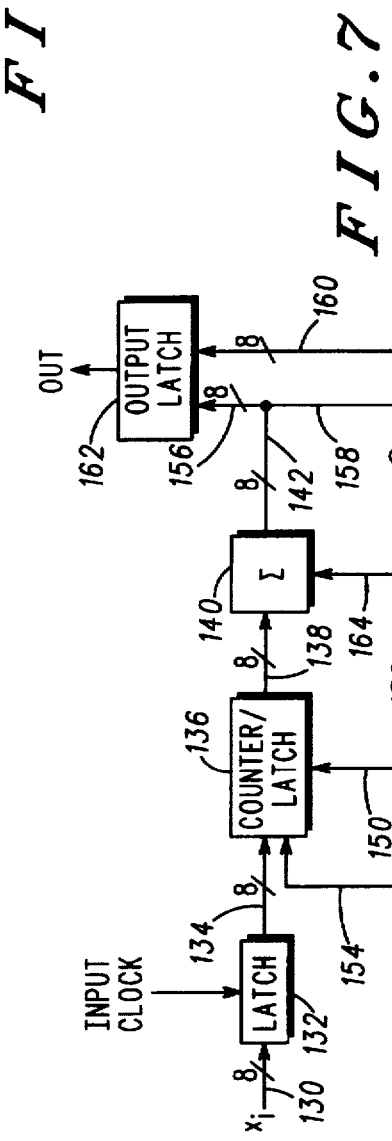
FIG. 7 is an exemplary logic circuit implementation of a neuron circuit included in one embodiment of the present invention.

FIG. 7 is an exemplary logic circuit implementation of a neuron circuit included in one embodiment of the present invention. In this embodiment, a plurality of inputs $x_i$ are sequentially applied to the neuron circuit.

The neuron circuit comprises five primary elements: counter/latch 136, adder 140, multiplexer (MUX) 146, latch 148, and output latch 162. An input latch 132 is also shown as part of this circuit implementation; however, in a neural network comprising a plurality of neuron circuits, as disclosed, for example, in the above-identified Related Invention No. 3, a single input latch 132 may be shared by a plurality of neuron circuits. Adder 140 represents the only significant processing element of the neuron circuit.

Figure 2:
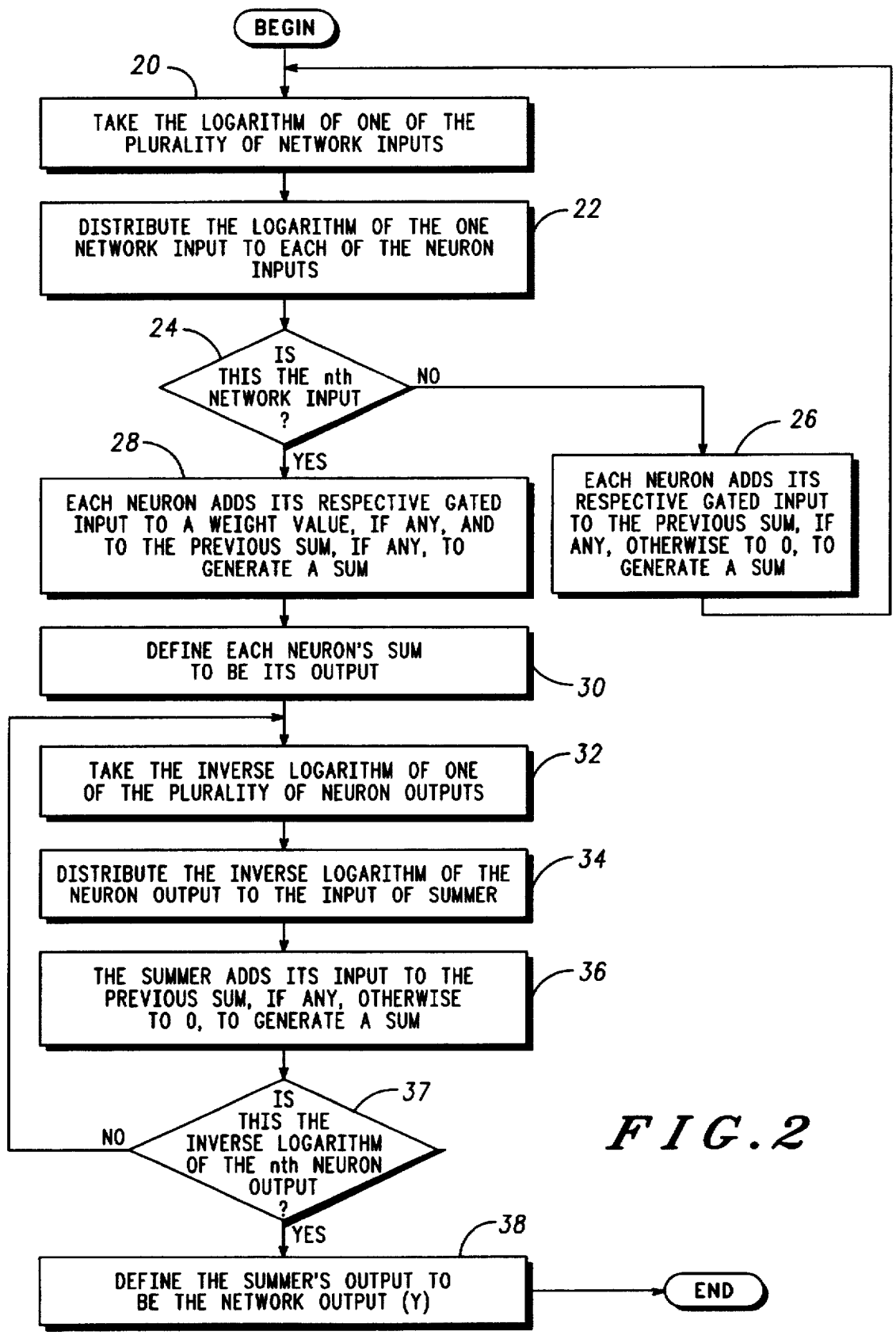
FIG. 2 shows a flow diagram of a method of using the neural network illustrated in FIG. 1.

Although FIG. 2 shows data busses 130, 134, 138, 142, 144, 156, 158, 160, and 164 as being eight bits in width, it will be understood by one of ordinary skill in the art that the widths of data busses may be eight bits or any other desired value.

Input latch 132 receives inputs $x_i$ over data bus 130. Input latch 132 is controlled by an INPUT CLOCK which is generated when the count in counter/latch 136 reaches zero. A neural network may comprise many neuron circuits, each having a counter/latch circuit. In such a network the INPUT CLOCK will not be generated until the count in all of the counter/latches reaches zero.

The output of input latch 132 is fed to counter/latch 136 via, for example, an 8-bit data bus 134. Counter/latch 136 and latch 148 are responsive to an internal clock signal (CLK). CLK increments at a constant rate. Counter/latch 136 and latch 148 receive CLK via lines 150 and 152, respectively.

Counter/latch 136 serves to hold the input data for a desired number of CLK cycles in order to produce the desired gating function. Counter/latch 136 is responsive to a gating input line 154 over which are provided values $g_i$ for the corresponding input values $x_i$. Inputs $x_1, x_2, \ldots, x_n$ are gated by respective gating functions $g_1, g_2, \ldots, g_n$ to produce gated inputs $g_i * x_i$. For example, if $g_i=2$, then the gated input corresponding to input $x_i$ is $2 * x_i$.

The output of counter/latch 136 is provided to adder 140 via an 8-bit data bus 138. The output of latch 148 is provided to adder 140 via an 8-bit data bus 164. The output of adder 140 is coupled to the input of latch 148 via 8-bit data bus segments 142 and 158 and via multiplexer 146. Multiplexer 146 multiplexes the output values of adder 140, received over bus segment 158, and weight W, received over bus 144, to the input of latch 148.

The output of adder 140 is also coupled to the input of output latch 162 via 8-bit data bus segment 156. Weight W is also coupled to an input of output latch 162 via an 8-bit bus segment 160. For certain calculations it will be understood that W can be sent to output latch 162 directly, bypassing the adder 140.

At the start of a computational cycle MUX 146 is switched to data bus 144 to receive weight W. After adder circuit 140 generates the first summation, MUX 146 switches to couple line 158 to latch 148. Latch 148 temporarily holds the output of adder 140 for addition with the output of counter/latch 136.

Counter/latch 136 functions as a count-down circuit. It is initially loaded with the value of $g_i$ and counts down to $g_i=0$. For each internal clock cycle, the value of $g_i$ is reduced by one. As long as $g_i$ is not equal to zero, the input value $x_i$ continues to be added by the summation of the previous addition cycle, which is applied over bus segments 142 and 158, through MUX 146, to latch 148. When $g_i$ equals zero, adder 140 stops adding and the output of adder 140, appearing at the output latch 162, represents the output (OUT) of the neuron circuit. The neuron circuit thus generates an output of the form $W+g_1x_1+g_2x_2+g_3x_3+g_4x_4+\ldots g_nx_n$.

Each neuron's accumulated sum is then applied to inverse-logarithmic function 12, which performs an inverse-logarithmic function upon its inputs. The inverse logarithms of the outputs of neurons 5–8 are then applied to a suitable summing means or function, such as summer 14, to produce the output y of the neural network.

FIG. 2 shows a flow diagram of a method of using the neural network illustrated in FIG. 1. As illustrated in box 20, first a logarithmic function is applied to one of the plurality of network inputs $x_i$. Next, as illustrated in box 22, the logarithm of input $x_i$ is distributed to each of neurons 5–8.

In decision box 24 a determination is made whether this is the nth network input. If so, the method proceeds to box 28, but, if not, it proceeds to box 26.

In box 26 each neuron 5–8 adds its respective gated input to its previously accumulated sum, if any, otherwise to zero, to generate a new accumulated sum. The method then returns to box 20.

In box 28 each neuron 5–8 adds its respective gated input to its previously accumulated sum, if any, and to a weight value, if any, to form an accumulated sum.

In box 30 each neuron's accumulated sum is defined to be its output. Next, in box 32, the inverse-logarithm is taken of one of the plurality of neuron 5–8 outputs. In box 34 the inverse-logarithm is distributed to the input of summer 14, and in box 36, the summer 14 adds this input to the previously accumulated sum, if any, otherwise to zero, to generate a new accumulated sum.

In decision box 37 a determination is made whether this is the inverse-logarithm of the last (i.e., the Nth) neuron output. If so, the method proceeds to box 38, but, if not, it returns to box 32.

In box 38 the summer's output is defined to be the output y of the neural network, and the procedure ends.

Figure 3:
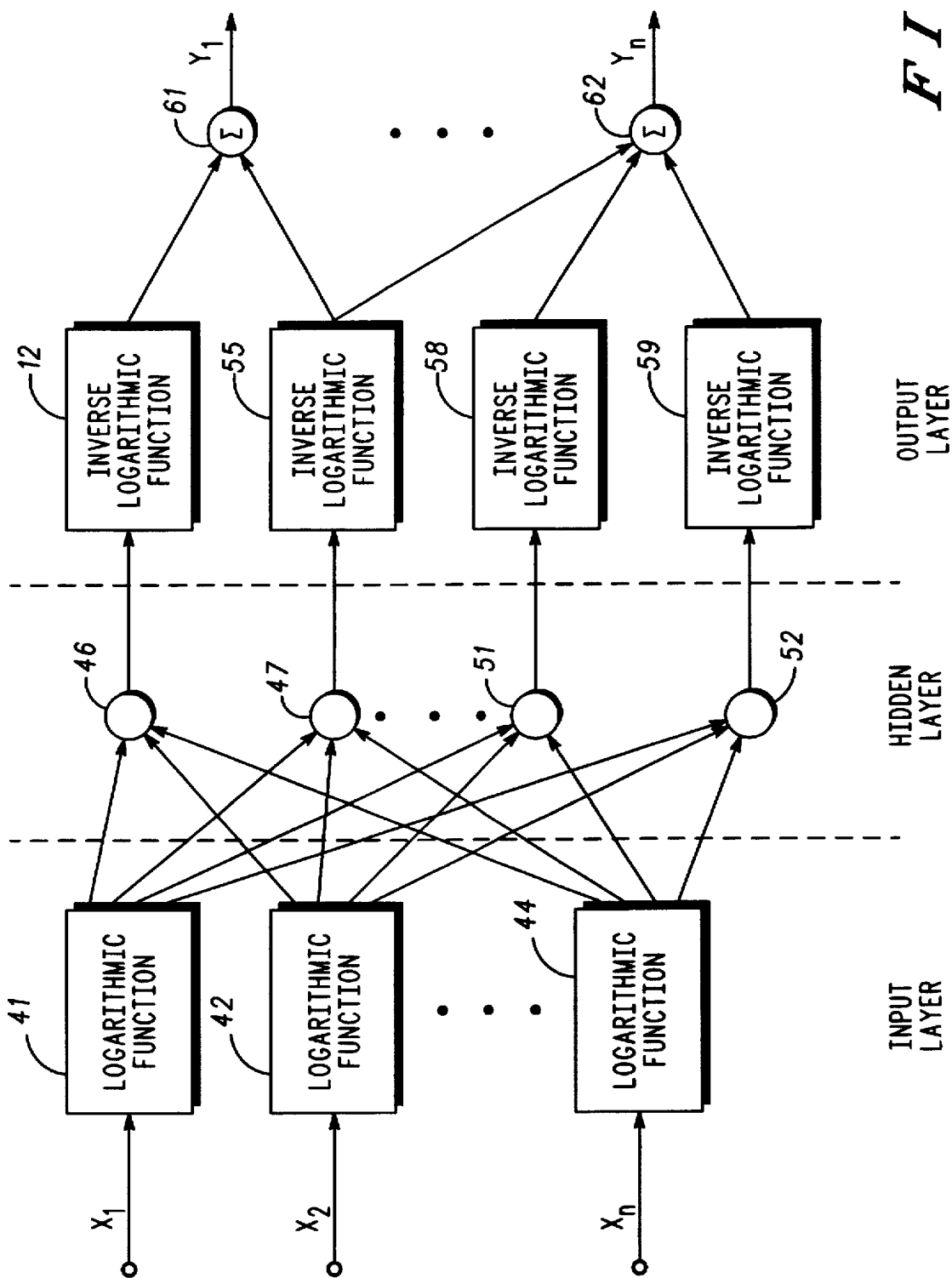
FIG. 3 shows a conceptual diagram of a neural network whose inputs are received in parallel and which has a plurality of outputs in accordance with the present invention.

FIG. 3 shows a conceptual diagram of a neural network whose inputs are received in parallel and which has a plurality of outputs in accordance with the present invention. A plurality of network inputs $x_1, x_2, \ldots,$ and $x_n$ are fed to logarithmic functions 41, 42, and 44, respectively.

The output of each logarithmic functions 41, 42, and 44 is distributed to each neuron (of which only neurons 46, 47, 51, and 52 are shown). For example, the output of logarithmic function 41 is distributed to each of neuron circuits 46, 47, 51, and 52, and to all other neuron circuits (not shown). The same connections are made regarding the outputs of logarithmic functions 42, 44, and all other logarithmic functions (not shown).

For this embodiment of the neural network the outputs of neuron circuits 46, 47, 51, and 52 are applied to inverse-logarithmic functions 54, 55, 58, and 59, respectively to produce the inverse-logarithms of these outputs.

Next, the inverse-logarithms of neurons 46 and 47 are summed by summer 61, whose output $y_1$ represents one output of this neural network. In addition, the inverse-logarithms of neurons 47, 51, and 52 are summed by summer 62, whose output $y_n$ represents another output of the neural network. Other outputs of neurons 46–52 are appropriately applied to additional summers (not illustrated) to produce other outputs $y_2$ through $Y_{n-1}$ of this neural network.

While FIG. 3 shows two summers or summing circuits, it will be understood by one of ordinary skill that more than two summers or summing circuits may be used. Also, although FIG. 3 shows that some of the network outputs are coupled, it will be understood that the outputs of the neuron circuits could also be decoupled.

Figure 4:
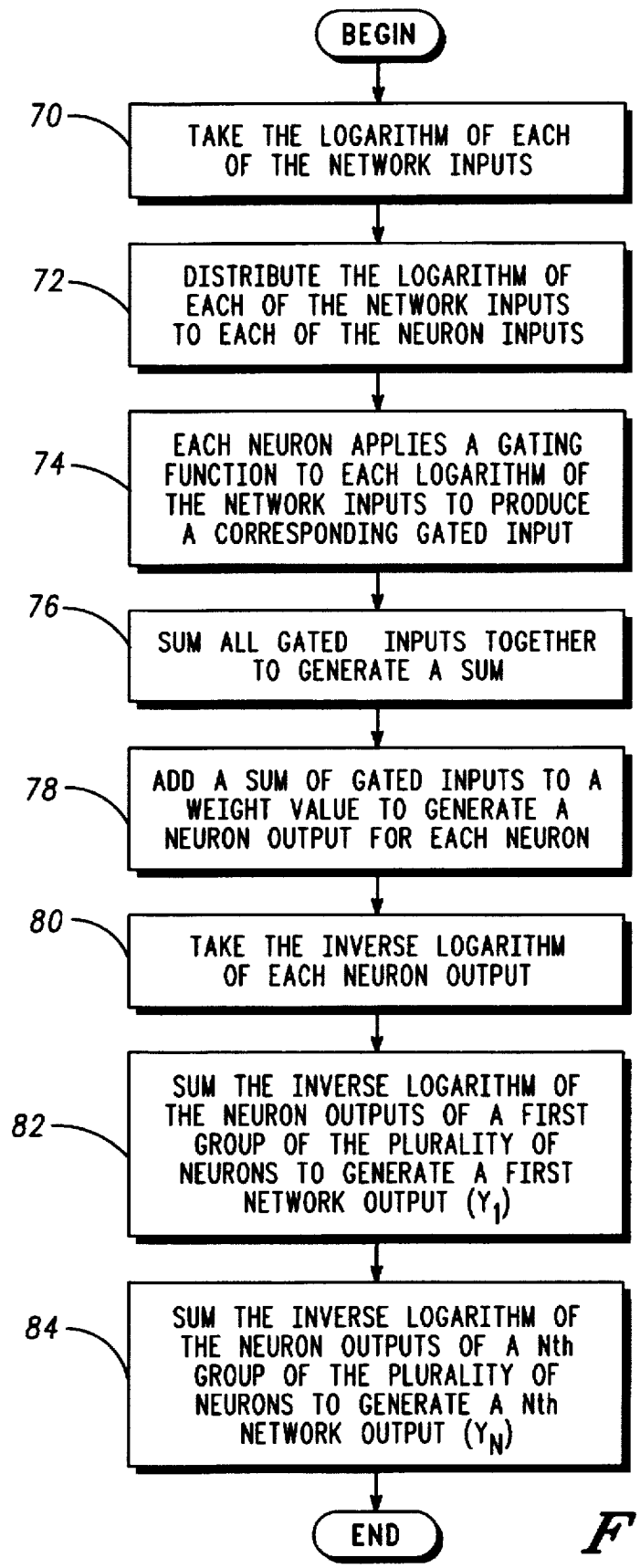
FIG. 4 shows a flow diagram of a method of using the neural network illustrated in FIG. 3.

FIG. 4 shows a flow diagram of a method of using the neural network illustrated in FIG. 3. As illustrated in box 70, the logarithm is taken of each of the network inputs (i.e. inputs $x_1, x_2, \ldots, x_n$). Next in box 72 this value is substantially simultaneously distributed to the inputs of each neuron (i.e. neurons 46, 47, . . . , 51, 52 in FIG. 3).

Next, as illustrated in box 74, each neuron applies a gating function to each logarithm of a network input to produce a corresponding gated input. As mentioned above regarding FIG. 3, any given neuron may apply a different gating function to each logarithm of a different network input it receives.

Next, as illustrated in box 76, the gated inputs for any given neuron are added together to generate a sum.

Next, as illustrated in box 78, the sum of the gated inputs for any given neuron is added to a predetermined weight value to generate a neuron output for such neuron. Also, as mentioned above regarding FIG. 3, any given neuron may apply a different weight value to its sum.

Next, regarding box 80, the inverse-logarithm is taken of each neuron output. In box 82, the inverse-logarithms of the neuron outputs of a first group of neurons (i.e. neurons 46 and 47) are summed by summer 61 to generate a first network output $y_1$.

Finally, regarding box 84, the inverse-logarithms of the neuron outputs of a second group of neurons (i.e. neurons 47, 51, and 52) are summed by summer 62 to generate a second network output $y_n$.

It will be understood by one of ordinary skill in the art that, as mentioned above regarding FIG. 3, additional groupings of inverse-logarithms of neurons 46–52 may be input into additional summers (not shown) to provide additional outputs $y_2$–$y_{n-1}$.

Figure 5:
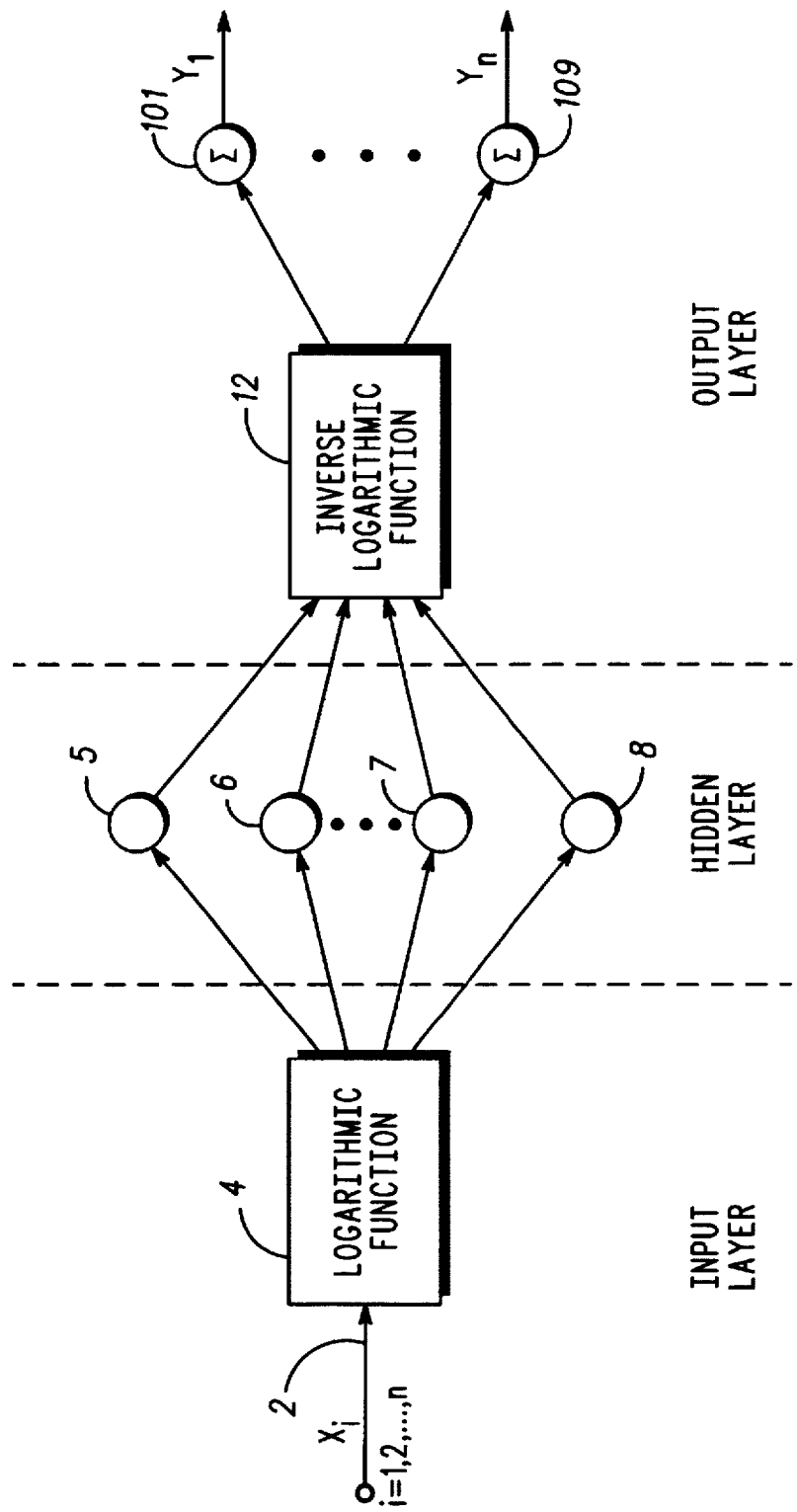
FIG. 5 shows a conceptual diagram of a neural network whose inputs are received sequentially and which has a plurality of outputs, in accordance with a preferred embodiment of the present invention.

FIG. 5 shows a conceptual diagram of a neural network whose inputs are received sequentially and which has a plurality of outputs, in accordance with a preferred embodiment of the invention. As shown in FIG. 1, a plurality of network inputs $x_1, x_2, \ldots, x_n$ are sequentially fed to a single logarithmic function 4. The output of logarithmic function 4 is distributed to each neuron (of which only neurons 5–8 are shown).

For this embodiment of the neural network the output of one of neurons 5–8 is first fed into inverse-logarithmic function 12, and the inverse-logarithm of such neuron output is then substantially simultaneously applied to each summer 101–109. Next, the output of another one of neurons 5–8 is fed into inverse-logarithm function 12, and its inverse-logarithm is substantially simultaneously applied to each summer 101–109.

Each summer 101–109 adds each newly received inverse-logarithm to its accumulated sum, otherwise to zero, and when it has received the inverse-logarithm of each of the neuron outputs, the finally accumulated sum of each summer 101–109 is defined to be the output $y_1$ through $y_n$ of the neural network.

It will be understood that the outputs of additional neurons (not shown) may be applied to additional inverse-logarithm functions (not shown) and applied to summers 101–109.

Figure 6:
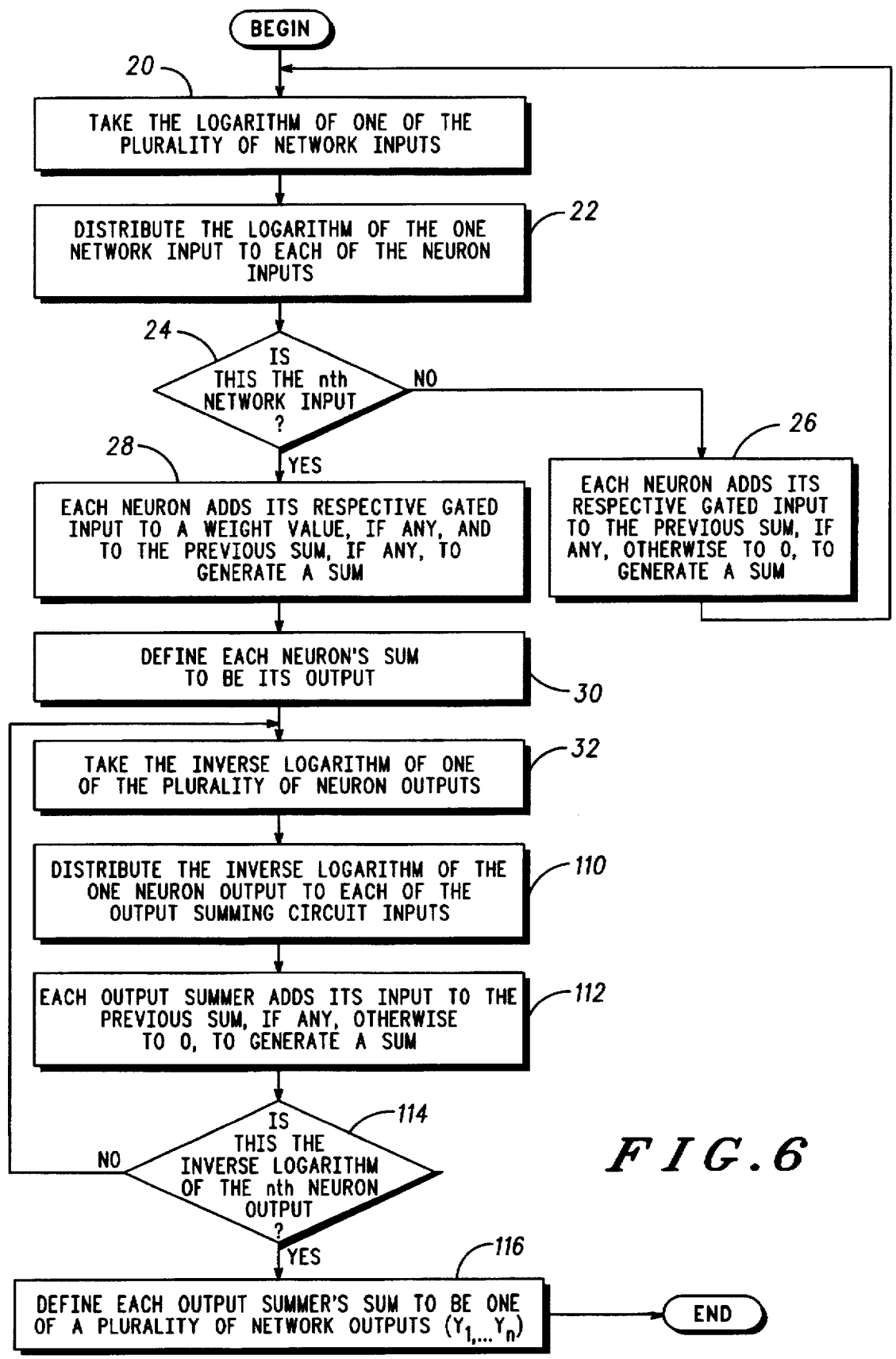
FIG. 6 shows a flow diagram of a method of using the neural network illustrated in FIG. 5.

FIG. 6 shows a flow diagram of a method of using the neural network illustrated in FIG. 5. Steps 20–32 of the method illustrated in FIG. 6 may be identical to the same steps illustrated in FIG. 2.

In step 110 the inverse-logarithm of the output of one of the neurons (e.g. neuron 5) is distributed to each of the output summers 101–109. In step 112, each summer adds its input to the previously accumulated sum, if any, otherwise to zero, to produce a newly accumulated sum.

In decision box 114 a determination is made whether this is the inverse-logarithm of the last (i.e., the Nth) neuron output. If so, the method proceeds to box 116, but, if not, it returns to box 32.

In step 116 each output summer's finally accumulated sum is defined to be one of the plurality of network outputs $y_1$ through $y_n$.

The operation of the neural network of the present invention is based upon the use of a polynomial expansion and, in a loose sense, the use of an orthogonal function, such as sine, cosine, exponential/logarithmic, Fourier transformation, Legendre polynomial, non-linear basis function such as a Volterra function or a radial basis function, or the like, or a combination of polynomial expansion and orthogonal functions.

A preferred embodiment employs a polynomial expansion of which the general case is represented by Equation 1 as follows:

$$y = \sum_{i=1}^{\infty} w_{i-1} x_1^{g_{1i}} x_2^{g_{2i}} \ldots x_n^{g_{ni}} \quad \text{Equation 1}$$

wherein $x_i$ represent the network inputs and can be a function such as $x_i = f_i(z_j)$, wherein $i=1, 2, \ldots, n$, wherein $z_j$ is any arbitrary variable, and wherein the indices i and j may be any positive integers; wherein y represents the output of the neural network; wherein $w_{i-1}$ represent the weight for the ith neuron; wherein $g_{1i}, \ldots, g_{ni}$ represent gating functions for the ith neuron and are integers, being 0 or greater in a preferred embodiment; and n is the number of network inputs.

Each term of Equation 1 expresses a neuron output and the weight and gating functions associated with such neuron. The operation of the neuron is described in Related Invention No. 2. It should be noted that each neuron, which will assume each input value is positive and will apply the logarithm function accordingly, will track the sign of each input and will produce the correct sign for the term of Equation No. 1.

The number of terms of the polynomial expansion to be used in a neural network is based upon a number of factors, including the number of available neurons, the number of training examples, etc. It should be understood that the higher order terms of the polynomial expansion usually have less significance than the lower order terms. Therefore, in a preferred embodiment, the lower order terms are chosen whenever possible, based upon the various factors mentioned above. Also, because the unit of measurement associated with the various inputs may vary, the inputs may need to be normalized before they are used.

Equation 2 is an alternative representation of Equation 1, showing terms up to the third order terms.

$$y = w_0 + \sum_{i=1}^{n} w_i x_i + \sum_{i=1}^{n} w_{f1(i)} x_i^2 + \quad \text{Equation 2}$$
$$\sum_{i=1}^{n} \sum_{j=i+1}^{n} w_{f2(i,j)} x_i x_j + \sum_{i=1}^{n} w_{f3(i)} x_i^3 +$$
$$\sum_{i=1}^{n} \sum_{j=i+1}^{n} w_{f4(i,j)} x_i^2 x_j + \sum_{i=1}^{n} \sum_{j=i+1}^{n} w_{f5(i,j)} x_i x_j^2 +$$
$$\sum_{i=1}^{n} \sum_{j=i+1}^{n} \sum_{k=i+j+1}^{n} w_{f6(i,j,k)} x_i x_j x_k + \ldots$$

wherein the variables have the same meaning as in Equation 1 and wherein $f_{1(i)}$ is an index function in the range of n+1 to 2n; $f_{2(i,j)}$ is an index function in the range of 2n+1 to 2n+(n)(n−1)/2; and $f_{3(i,j)}$ is in the range of 2n+1+(n)(n−1)/2 to 3n+(n)(n−1)/2. And $f_4$ through $f_6$ are represented in a similar fashion.

Those skilled in the art will recognize that the gating functions are embedded in the terms expressed by Equation 2. For example, Equation 2 can be represented as follows:

$$y = w_0 + w_1 x_1 + w_2 x_2 + \ldots w_i x_i + \ldots + w_n x_n + \quad \text{Equation 3}$$
$$w_{n+1} x_1^2 + \ldots + w_{2n} x_n^2 +$$
$$w_{2n+1} x_1 x_2 + w_{2n+2} x_1 x_3 + \ldots +$$
$$w_{3n-1} x_1 x_n + w_{3n} x_2 x_3 + w_{3n+1} x_2 x_4 + \ldots$$
$$w_{2n+(n)(n-1)/2} x_{n-1} x_n + \ldots +$$
$$w_{N-1} x_1^{g_{1N}} x_2^{g_{2N}} \ldots x_n^{g_{nN}} + \ldots$$

wherein the variables have the same meaning as in Equation 1.

It should be noted that although the gating function terms $g_{in}$ explicitly appear only in the last shown term of Equation 3, it will be understood that each of the other terms has its $g_{iN}$ term explicitly shown (e.g. for the $w_1 x_1$ term $g_{12}=1$ and the other $g_{i2}=0$, i=2, 3, . . . . , n). N is any positive integer and represents the Nth neuron in the network.

TRAINING ALGORITHM

For the neural network to be useful, the weights of each neuron circuit must be determined. This can be accomplished by the use of an appropriate training algorithm, as described, for example, in Related Invention No. 3.

SUMMARY

Thus there has been described herein a concept, as well as several embodiments including a preferred embodiment, of a neural network which utilizes a plurality of neurons each of which requires only a adder as its main processing element.

Because the various embodiments of neural networks, and the methods of using and training same, as herein-described do not require repetitive training and provide a global minimum to each given set of input vectors, they perform with vastly more accurate results, at a vastly improved reduction in computational time, and with a vast reduction in the cost and complexity of implementation, whether on a semiconductor chip or in a computer program.

Furthermore, it will be apparent to those skilled in the art that the disclosed invention may be modified in numerous ways and may assume many embodiments other than the preferred form specifically set out and described above.

It will be understood that the concept of the present invention can vary in many ways. For example, it is a matter of design choice regarding such system structural elements as the number of input nodes, number of neurons or neuron circuits, and the number of logarithmic, inverse-logarithmic, and summing means or circuits and their interconnection, depending upon the integrated circuit technology, type of implementation (e.g. analog, digital, software, etc.), die sizes, pin-outs, and so on.

It will also be apparent that the degree of truncation of the above-mentioned polynomial expansion depends upon the degree of accuracy desired.

Accordingly, it is intended by the appended claims to cover all modifications of the invention which fall within the true spirit and scope of the invention.

What is claimed is:

1. A neural network for generating at least one network output signal in response to a plurality of network input signals, said neural network comprising:
   a logarithmic function circuit generating a plurality of logarithmic input signals in response to said network input signals;
   a plurality of neurons for generating a plurality of neuron output signals, each of said neurons generating a neuron output signal in response to said plurality of logarithmic input signals;
   an inverse-logarithmic function circuit for generating a plurality of inverse-logarithmic output signals in response to said neuron output signals; and
   a summing circuit for summing said inverse-logarithmic output signals to generate said at least one network output signal.

2. The neural network recited claim 1 wherein said neurons comprise a linear transfer function.

3. The neural network recited claim 1 wherein said neural network is contained on at least one integrated circuit.

4. The neural network of claim 1, wherein at least one of the plurality of neurons comprises a latch and an adder.

5. The neural network of claim 1, wherein at least one of the plurality of neurons comprises a counter and a latch.

6. The neural network of claim 1, wherein none of the input signals comprise time series data indicating economic phenomena.

7. A neural network for generating a plurality of network output signals in response to a plurality of network input signals, said neural network comprising:
   means for applying a logarithmic function to said network input signals to produce a plurality of logarithmic input signals;
   a plurality of neuron circuits for generating a plurality of neuron output signals, each of said neuron circuits generating a neuron output signal in response to at least one of said plurality of logarithmic input signals;
   means for applying an inverse-logarithmic function to each of said neuron output signals to produce a plurality of inverse-logarithmic output signals; and
   a plurality of summing circuits, each of said summing circuits summing predetermined ones of said inverse-logarithmic output signals to generate said network output signals.

8. The neural network recited in claim 7 wherein said neurons comprise a linear transfer function.

9. The neural network recited in claim 7 wherein at least some of said inverse-logarithmic outputs are summable by more than one of said summing circuits.

10. The neural network recited in claim 7 wherein said neural network is contained on at least one integrated circuit.

11. A neural network for generating at least one network output signal in response to a sequence of network input signals, said neural network comprising:
   a logarithmic function circuit for receiving successive ones of said sequence of network input signals and for applying a logarithmic function to each of said network input signals to produce a plurality of logarithmic input signals;
   a plurality of neuron circuits for generating a plurality neuron output signals, each of said neuron circuits having at least one input and generating a neuron output signal;
   means for distributing said logarithmic input signals to said at least one input of each of said plurality of neuron circuits;
   an inverse-logarithmnic function circuit for applying an inverse-logarithmic function to each of said neuron output signals to produce a plurality of inverse-logarithmic output signals; and
   a summing circuit for summing said inverse-logarithmic output signals to generate said at least one network output signal.

12. The neural network recited in claim 11 wherein said neurons comprise a linear transfer function.

13. The neural network recited in claim 11 wherein said summing circuit comprises a plurality of summers each summing predetermined ones of said inverse-logarithmic output signals and generating said network output signals.

14. The neural network recited in claim 13 wherein at least some of said inverse-logarithmic output signals are summable by more than one of said summers.

15. The neural network recited in claim 11 wherein said neural network is contained on at least one integrated circuit.

16. In a neural network, a method of generating at least one network output signal in response to receiving a plurality of network input signals, said method comprising the following steps:
   (a) applying said network input signals to a logarithmic function circuit to produce a corresponding plurality of logarithmic inputs;
   (b) distributing each of said logarithmic inputs to a plurality of neurons;
   (c) each of said neurons applying a gating function to each of said logarithmic inputs to produce a corresponding plurality of gated inputs;
   (d) each of said neurons summing said gated inputs to generate a sum;
   (e) each of said neurons adding said sum to a weight value to generate a neuron output signal, whereby generating a plurality of neuron output signals;
   (f) applying each of said neuron output signals to an inverse-logarithmic function circuit to produce a corresponding plurality of inverse-logarithmic outputs; and (g) summing said inverse-logarithmic outputs to generate said at least one network output signal.

17. The method recited in claim 16, wherein said at least one network output signal is based upon a polynomial expansion.

18. The method of operating a neural network recited in claim 17 wherein said polynomial expansion has the form:

$$y = \sum_{i=1}^{\infty} w_{i-1} x_1^{g_{1i}} x_2^{g_{2i}} \ldots x_n^{g_{ni}}$$

wherein y represents the output of the neural network;

wherein $w_{i-1}$ represents the weight value for the ith neuron;

wherein $x_1, x_2, \ldots, x_n$ represent inputs to said neural network;

wherein $g_{1i}, \ldots, g_{ni}$ represent gating functions for the ith neuron which are applied to said inputs; and wherein n is a positive integer.

19. The method of operating a neural network recited in claim 18 wherein each $x_i$ is represented by the function $x_i = f_i(z_j)$, wherein $z_j$ is any arbitrary variable, and wherein the indices i and j are any positive integers.

20. The method recited in claim 18, wherein said at least one network output signal is based upon a truncated version of said polynomial expansion.

21. The method of operating a neural network recited in claim 17 wherein said polynomial expansion has the form:

$$y = w_0 + \sum_{i=1}^{n} w_i x_i + \sum_{i=1}^{n} w_{f1(i)} x_i^2 + \sum_{i=1}^{n} \sum_{j=i+1}^{n} w_{f2(i,j)} x_i x_j +$$
$$\sum_{i=1}^{n} w_{f3(i)} x_i^3 + \sum_{i=1}^{n} \sum_{j=i+1}^{n} w_{f4(i,j)} x_i^2 x_j + \sum_{i=1}^{n} \sum_{j=i+1}^{n} w_{f5(i,j)} x_i x_j^2 +$$
$$\sum_{i=1}^{n} \sum_{j=i+1}^{n} \sum_{k=i+j+1}^{n} w_{f6(i,j,k)} x_i x_j x_k + \ldots$$

wherein y represents the output of the neural network;

wherein $w_{i-1}$ represents the weight value for the ith neuron;

wherein $x_i, x_j, x_k$ represent inputs to said neural network;

wherein n is a positive integer; and wherein $f_{1(i)}$ through $f_{6(i,j,k)}$ are index-generating functions.

22. The method of operating a neural network recited in claim 17 wherein said polynomial expansion has the form:

$$y = w_0 + w_1 x_1 + w_2 x_2 + \ldots w_i x_i + \ldots + w_n x_n +$$
$$w_{n+1} x_1^2 + \ldots + w_{2n} x_n^2 + w_{2n+1} x_1 x_2 + w_{2n+2} x_1 x_3 + \ldots +$$
$$w_{3n-1} x_1 x_n + w_{3n} x_2 x_3 + w_{3n+1} x_2 x_4 +$$
$$\ldots w_{2n+(n)(n-1)/2} x_{n-1} x_n + \ldots + w_{N-1} x_1^{g_{1N}} x_2^{g_{2N}} \ldots x_n^{g_{nN}} + \ldots$$

wherein y represents the output of the neural network;

wherein $w_0, w_1, \ldots, w_{N-1}$ represent weight values, N being a positive integer representing the Nth neuron, and the term $w_i$ in general representing the weight value associated with the i+1 neuron;

wherein $x_1, x_2, \ldots, x_n$ represent inputs to said neural network, n being a positive integer; and wherein $g_{1N}, \ldots, g_{nN}$ represent gating functions for the Nth neuron which are applied to said inputs.

23. The method recited in claim 16, wherein said at least one network output signal is based upon an orthogonal function.

24. The method of operating a neural network recited in claim 23 wherein said orthogonal function is a sine, cosine, exponential, logarithmic, Fourier transformation, Legendre polynomial, or a non-linear function such as a Volterra function or a radial basis function.

25. The method recited in claim 16, wherein said at least one network output signal is based upon a combination of polynomial expansion and orthogonal functions.

26. The method of operating a neural network recited in claim 16 wherein said neural network is contained on at least one integrated circuit.

27. The method of operating a neural network recited in claim 16 wherein said neural network is contained in a computer program.

28. In a neural network, a method of generating at least one network output signal in response to a plurality of network input signals, said method comprising the following steps:

(a) applying said network input signals to a logarithmic function to produce a plurality of logarithmic inputs;

(b) distributing each of said logarithmic inputs to a plurality of neuron circuits;

(c) each of said neuron circuits applying a gating function to each of said logarithmic inputs to produce a plurality of gated inputs;

(d) each of said neuron circuits summing said gated inputs to generate a sum;

(e) each of said neuron circuits adding said sum to a weight value to generate a neuron output signal, whereby generating a plurality of neuron output signals; and (f) applying said neuron output signals to an inverse-logarithmic function to produce a plurality of inverse-logarithmic outputs;

(g) summing ones of said inverse-logarithmic outputs corresponding to a first group of said plurality of neuron circuits to generate a first network output signal; and (h) summing ones of said inverse-logarithmic outputs corresponding to a second group of said plurality of neuron circuits to generate a second network output signal.

29. The method of operating a neural network recited in claim 28 wherein in steps (g) and (h) at least some of said neurons may be in both said first and second groups of said plurality of neurons.

30. The method recited in claim 28, wherein said first network output signal is based upon a polynomial expansion.

31. The method of operating a neural network recited in claim 30 wherein said polynomial expansion has the form:

$$y = \sum_{i=1}^{\infty} w_{i-1} x_1^{g_{1i}} x_2^{g_{2i}} \ldots x_n^{g_{ni}}$$

wherein y represents the output of the neural network;

wherein $w_{i-1}$ represents the weight value for the ith neuron;

wherein $x_1, x_2, \ldots, x_n$ represent inputs to said neural network;

wherein $g_{1i}, \ldots, g_{ni}$ represent gating functions for the ith neuron which are applied to said inputs; and wherein n is a positive integer.

32. The method of operating a neural network recited in claim 31 wherein each $x_i$ is represented by the function $x_i = f_i(z_j)$, wherein $z_j$ is any arbitrary variable, and wherein the indices i and j are any positive integers.

33. The method recited in claim 31, wherein said first network output signal is based upon a truncated version of said polynomial expansion.

34. The method of operating a neural network recited in claim 30 wherein said polynomial expansion has the form:

$$y = w_0 + \sum_{i=1}^{n} w_i x_i + \sum_{i=1}^{n} w_{f1(i)} x_i^2 +$$

$$\sum_{i=1}^{n} \sum_{j=i+1}^{n} w_{f2(i,j)} x_i x_j + \sum_{i=1}^{n} w_{f3(i)} x_i^3 +$$

$$\sum_{i=1}^{n} \sum_{j=i+1}^{n} w_{f4(i,j)} x_i^2 x_j + \sum_{i=1}^{n} \sum_{j=i+1}^{n} w_{f5(i,j)} x_i x_j^2 +$$

$$\sum_{i=1}^{n} \sum_{j=i+1}^{n} \sum_{k=i+j+1}^{n} w_{f6(i,j,k)} x_i x_j x_k + \ldots$$

wherein y represents the output of the neural network;

wherein $w_{i-1}$ represents the weight value for the ith neuron;

wherein $x_i$, $x_j$, $x_k$ represent inputs to said neural network;

wherein n is a positive integer; and wherein $f_{1(i)}$ through $f_{6(i,j,k)}$ are index-generating functions.

35. The method of operating a neural network recited in claim 30 wherein said polynomial expansion has the form:

$$y = w_0 + w_1 x_1 + w_2 x_2 + \ldots w_i x_i + \ldots + w_n x_n +$$

$$w_{n+1} x_1^2 + \ldots + w_{2n} x_n^2 +$$

$$w_{2n+1} x_1 x_2 + w_{2n+2} x_1 x_3 + \ldots +$$

$$w_{3n-1} x_1 x_n + w_{3n} x_2 x_3 + w_{3n+1} x_2 x_4 + \ldots$$

$$w_{2n+(n)(n-1)/2} x_{n-1} x_n + \ldots +$$

$$w_{N-1} x_1^{g1N} x_2^{g2N} \ldots x_n^{gnN} + \ldots$$

wherein y represents the output of the neural network;

wherein $w_0$, $w_1$, ..., $w_{N-1}$ represent weight values, N being a positive integer representing the Nth neuron, and the term $w_i$ in general representing the weight value associated with the i+1 neuron;

wherein $x_1$, $x_2$, ..., $x_n$ represent inputs to said neural network, n being a positive integer; and wherein $g_{1N}$, ..., $g_{nN}$ represent gating functions for the Nth neuron which are applied to said inputs.

36. The method recited in claim 28, wherein said first network output signal is based upon an orthogonal function.

37. The method of operating a neural network recited in claim 36 wherein said orthogonal function is a sine, cosine, exponential, logarithmic, Fourier transformation, Legendre polynomial, or a non-linear function such as a Volterra function or a radial basis function.

38. The method recited in claim 28, wherein said first network output signal is based upon a combination of polynomial expansion and orthogonal functions.

39. The method of operating a neural network recited in claim 28 wherein said neural network is contained on at least one integrated circuit.

40. The method of operating a neural network recited in claim 28 wherein said neural network is contained in a computer program.

41. In a neural network, a method of generating at least one network output signal in response to a sequence of network input signals, said method comprising the following steps:

(a) successively applying said network input signals to a logarithmic function circuit to produce a corresponding sequence of logarithmic input signals;

(b) distributing one of said logarithmic input signals to a plurality of neuron circuits;

(c) each of said neuron circuits applying a respective one of a plurality of gating functions to said one logarithmic input signal to produce a respective gated input;

(d) determining whether said one logarithmic input signal corresponds to a first network input signal;
  (i) if so, proceeding to step (e);
  (ii) if not, proceeding to step (f);

(e) each of said neuron circuits adding said respective gated input to a respective one of a plurality of weight values to generate a sum, then returning to step (b);

(f) each of said neuron circuits accumulating said respective gated input into said sum;

(g) determining whether all of said sequence of logarithmic input signals have been distributed;
  (i) if so, proceeding to step (h);
  (ii) if not, returning to step (b);

(h) for each of said neuron circuits, equating said sum to a neuron output signal, whereby generating a plurality of neuron output signals;

(i) applying said plurality of neuron output signals to an inverse-logarithmic function circuit to produce a plurality of inverse-logarithmic output signals; and (j) summing ones of said inverse-logarithmic output signals corresponding to a first group of said plurality of neuron circuits to generate a first network output signal (y1); and (k) summing ones of said inverse-logarithmic output signals corresponding to a second group of said plurality of neurons to generate a second network output signal (y2).

42. The method of operating a neural network recited in claim 41 wherein in steps (j) and (k) at least some of said neurons may be in both said first and second groups of said plurality of neurons.

43. The method recited in claim 41, wherein said first network output signal is based upon a polynomial expansion.

44. The method of operating a neural network recited in claim 43 wherein said polynomial expansion has the form:

$$y = \sum_{i=1}^{\infty} w_{i-1} x_1^{g1i} x_2^{g2i} \ldots x_n^{gni}$$

wherein y represents the output of the neural network;

wherein $w_{i-1}$ represents the weight value for the ith neuron;

wherein $x_1$, $x_2$, ..., $x_n$ represent inputs to said neural network;

wherein $g_{1i}$, ..., $g_{ni}$ represent gating functions for the ith neuron which are applied to said inputs; and wherein n is a positive integer.

45. The method of operating a neural network recited in claim 44 wherein each $x_i$ is represented by the function $x_i = f_i(z_j)$, wherein $z_j$ is any arbitrary variable, and wherein the indices i and j are any positive integers.

46. The method recited in claim 44, wherein said first network output signal is based upon a truncated version of said polynomial expansion.

47. The method of operating a neural network recited in claim 43 wherein said polynomial expansion has the form:

$$y = w_0 + \sum_{i=1}^{n} w_i x_i + \sum_{i=1}^{n} w_{f1(i)} x_i^2 +$$
$$\sum_{i=1}^{n} \sum_{j=i+1}^{n} w_{f2(i,j)} x_i x_j + \sum_{i=1}^{n} w_{f3(i)} x_i^3 +$$
$$\sum_{i=1}^{n} \sum_{j=i+1}^{n} w_{f4(i,j)} x_i^2 x_j + \sum_{i=1}^{n} \sum_{j=i+1}^{n} w_{f5(i,j)} x_i x_j^2 +$$
$$\sum_{i=1}^{n} \sum_{j=i+1}^{n} \sum_{k=i+j+1}^{n} w_{f6(i,j,k)} x_i x_j x_k + \ldots$$

wherein y represents the output of the neural network;

wherein $w_{i-1}$ represents the weight value for the ith neuron;

wherein $x_i$, $x_j$, $x_k$ represent inputs to said neural network;

wherein n is a positive integer; and wherein $f_{1(i)}$ through $f_{6(i,j,k)}$ are index-generating functions.

48. The method of operating a neural network recited in claim 43 wherein said polynomial expansion has the form:

$$y = w_0 + w_1 x_1 + w_2 x_2 + \ldots w_i x_i + \ldots + w_n x_n +$$
$$w_{n+1} x_1^2 + \ldots + w_{2n} x_n^2 +$$
$$w_{2n+1} x_1 x_2 + w_{2n+2} x_1 x_3 + \ldots +$$
$$w_{3n-1} x_1 x_n + w_{3n} x_2 x_3 + w_{3n+1} x_2 x_4 + \ldots$$
$$w_{2n+(n)(n-1)/2} x_{n-1} x_n + \ldots +$$
$$w_{N-1} x_1^{g1N} x_2^{g2N} \ldots x_n^{gnN} + \ldots$$

wherein y represents the output of the neural network;

wherein $w_0, w_1, \ldots, w_{N-1}$ represent weight values, N being a positive integer representing the Nth neuron, and the term $w_i$ in general representing the weight value associated with the i+1 neuron;

wherein $x_1, x_2, \ldots, x_n$ represent inputs to said neural network, n being a positive integer; and wherein $g_{1N}, \ldots, g_{nN}$ represent gating functions for the Nth neuron which are applied to said inputs.

49. The method recited in claim 41, wherein said first network output signal is based upon an orthogonal function.

50. The method of operating a neural network recited in claim 49 wherein said orthogonal function is a sine, cosine, exponential, logarithmic, Fourier transformation, Legendre polynomial, or a non-linear function such as a Volterra function or a radial basis function.

51. The method recited in claim 41, wherein said first network output signal is based upon a combination of polynomial expansion and orthogonal functions.

52. The method of operating a neural network recited in claim 41 wherein said neural network is contained on at least one integrated circuit.

53. The method of operating a neural network recited in claim 41 wherein said neural network is contained in a computer program.

* * * * *